United States Patent [19]
Yokoyama

[11] Patent Number: 4,685,486
[45] Date of Patent: Aug. 11, 1987

[54] CONDENSATE SEPARATING AND DISCHARGING DEVICE WITH APERTURED FLOAT COVER

[76] Inventor: Takeshi Yokoyama, 238 3 Agata-cho, Ono-Shi Hyogo, 675-13, Japan

[21] Appl. No.: 908,377

[22] Filed: Sep. 17, 1986

[30] Foreign Application Priority Data

Sep. 17, 1985 [JP] Japan .............................. 60-205628

[51] Int. Cl.$^4$ ................................................ F16T 1/20
[52] U.S. Cl. ...................................... 137/179; 137/192
[58] Field of Search ............... 137/192, 203, 204, 193, 137/194, 195, 505.42, 505.39, 433, 179

[56] References Cited

U.S. PATENT DOCUMENTS

| | | | |
|---|---|---|---|
| 2,726,732 | 12/1955 | Faust | 137/193 X |
| 2,876,793 | 3/1959 | Vanderpoel | 137/505.42 |
| 3,348,564 | 10/1967 | Sochting | 137/193 |
| 3,418,789 | 12/1968 | Hoffman | 137/195 X |

FOREIGN PATENT DOCUMENTS 1502917  3/1978  United Kingdom .

Primary Examiner—Alan Cohan
Attorney, Agent, or Firm—Toren, McGeady & Associates

[57] ABSTRACT

A condensate separating and discharging device including a pressure reducing valve, a separator section and a steam trap section provided below the separator section. The steam trap section includes a condensate discharging valve having a float, a dome-like float cover for covering the float and at least one small hole formed through the float cover. The invention is directed to an improvement whereby the small hole formed in the cover is located at a position on a circle having a center identical with that of the float cover and having a radius obtained by multiplying the outer diameter of the float cover by an empirical coefficient having a value between 0.2 and 0.36.

6 Claims, 3 Drawing Figures

CONDENSATE SEPARATING AND DISCHARGING DEVICE WITH APERTURED FLOAT COVER

The present invention relates generally to a condensate separating and discharging device involving a steam trap integrally coupled to a separator to be employed in general steam piping, for example, and more particularly to a condensate separating and discharging device having improved drain separation efficiency.

PRIOR ART

Conventionally, it is common in the prior art that a steam trap, separator and pressure reducing valve, etc. be independently formed and connected to one another and mounted in steam piping.

In such prior art devices, it has been found to be very troublesome to install piping equipment where associated devices, such as a pressure reducing valve, separator and steam trap, are installed in steam piping. It is also troublesome to adjust each of the related mechanisms. To cope with this, it has been suggested that such associated devices be integrally coupled to one another.

In condensate separating and discharging devices having such an integral structure, a cylindrical member is provided in an outer shell to form a steam induction passage as a separator between an outer surface of the cylindrical member and an inner wall surface of the outer shell, so as to permit the steam induced from an inlet orifice to swirl down along the inner wall surface of the outer shell, and permit the steam supplied through the cylindrical member to be fed from an outlet orifice. Further, a steam trap section including a discharge valve having a float and a float cover covering the float is provided below the cylindrical member.

In the aforementioned device, it is necessary to form a small air venting hole through the float cover. The gas containing the condensate collides with the inner wall surface of the outer shell when passing through the steam induction passage in the separator section and the condensate is separated from the steam. Then, the condensate is deposited and gathered at a bottom portion of the outer shell. In this case, if the small hole is not provided, the float is hindered from being lifted by the pressure of residual air in the float cover when the condensate is increased. As a result, the condensate cannot be discharged. Therefore, it is naturally necessary to form the small hole through the float cover. If the small hole is provided at the top of the float cover, the condensate in the float cover whirls up through the small hole by the action of the steam which continues to swirl even after passing through the steam induction passage, resulting in deterioration of the separation efficiency of the condensate from the steam.

SUMMARY OF THE INVENTION

The present invention is directed toward solving the aforementioned problems and, according to the invention, in a condensate separating and discharging device having a float cover formed with at least one small hole, an improvement is provided in that the small hole is formed at a position on the cover on a circle having a center identical with that of the float cover and having a radius obtained by multiplying an outer diameter of the float cover by a coefficient ranging from 0.2 to 0.36. The device may also be applied for separation and discharge of a drain from compressed air or any other gas as well as steam.

According to the present invention, the gas containing the condensate as induced from the inlet hole is swirled down in the induction passage and is fed to the vicinity of the float cover. Then, the condensate is primarily dropped along the inner wall surface of the outer shell during passage through the induction passage and is gathered at the bottom portion of the outer shell. On the other hand, the gas rises from the vicinity of the float cover through the cylindrical member and is supplied from the outlet hole. When the condensate gathered at the bottom portion of the outer shell reaches a predetermined level, the float is lifted to open the discharge valve and discharge the condensate.

If the small hole is formed at the top of the float cover, the condensate in the float cover is turbulently whirled up since the gas having reached the vicinity of the float cover is swirling.

However, according to the present invention, the small hole is formed at the position as mentioned above, and, thus, there is no possibility of the condensate being whirled up.

The various features of novelty which characterize the invention are pointed out with particularity in the claims annexed to and forming a part of this disclosure. For a better understanding of the invention, its operating advantages and specific objectives attained by its use, reference should be had to the drawings and descriptive matter in which there is illustrated and described a preferred embodiment of the invention.

DETAILED DESCRIPTION OF THE PREFERRED EMBODIMENT

Figure 3:
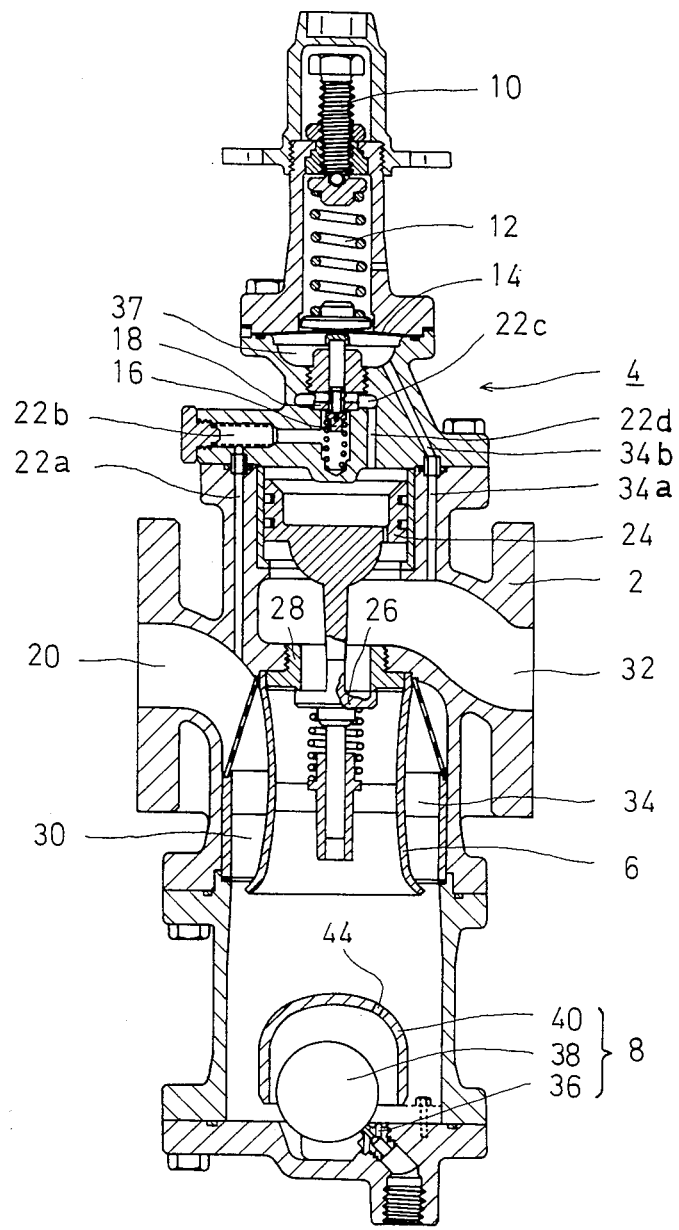
FIG. 3 is a vertical sectional view of a condensate separating and discharging device in accordance with a preferred embodiment of the invention.

FIG. 3 shows a vertical sectional view of a preferred embodiment of the present invention. In the preferred embodiment, a condensate separating and discharging device for steam involving a pressure reducing valve comprises an outer shell 2, a pressure reducing valve section 4 formed in the outer shell 2, a separator section 30 formed below the pressure reducing valve section 4, and a steam trap section 8 formed below the separator section 30.

In the pressure reducing valve section 4, a predetermined secondary steam pressure is set under the condition where the adjusting coil spring 12 is set by an adjusting screw 10. When a diaphragm 14 is pressed down because of reduction in secondary steam pressure acting on a lower side of the diaphragm, a pilot valve 16 is separated from a valve seat 18. As a result, primary steam pressure in an inlet orifice 20 is fed through passages 22a, 22b, 22c and 22d into a piston 24. As a result, the piston 24 slides downwardly and a main valve 26 abutting against a lower end of the piston 24 is separated from a valve seat 28. The primary pressure steam in the inlet orifice 20 is allowed to pass through the separator section 30 defined between the outer shell 2 and a separator 6 and enters the separator 6. Then, the primary pressure steam passes through the main valve 26 which has been opened and reaches an outlet orifice 32. The outlet orifice 32 communicates through passages 34a and 34b to a chamber 37 involving the diaphragm 14. When steam pressure in the outlet orifice 32, that is, the secondary steam pressure, becomes higher than the valve setting determined by the adjusting coil spring 12, the diaphragm 14 is pressed up against a biasing force of the adjusting coil spring 12 to adjust the opening degree of the pilot valve 16 and thereby reduce the secondary steam pressure to the valve setting. In contrast, when the secondary steam pressure is lower than the set value, the opening degree of the pilot valve is enlarged to increase the secondary steam pressure to the set value. In other words, the pressure reducing valve section 4 is designed to feed a secondary steam pressure equal to the set value.

The separator section 30 comprises a steam induction passage defined between an outer circumferential surface of the substantially cylindrical separator 6 and an inner wall surface of the outer shell 2. The cylindrical member 6 is formed at its outer surface with a guide (not shown), so that the steam passing through the separator section 30 may be guided spirally downwardly along the inner wall surface of the outer shell 2. While the steam is swirling in the separator section 30 in this manner, a condensate is deposited on the inner wall surface of the outer shell 2 and is dropped to gather at a bottom portion of the outer shell 2. The steam after separation from the condensate is allowed to pass through the cylindrical member 6 to the pressure reducing valve section 4. The cylindrical member 6 is provided with a plurality of supports 34 arranged at appropriate intervals on an outer circumferential edge and is fixed to the inner wall surface of the outer shell 2 by means of the supports 34.

The steam trap section 8 includes a drain valve seat 36 which communicates with the outside at the bottom portion of the outer shell 2. A float 38 is provided so as to be seated on and separated from the drain valve seat 36. When the condensate gathered at the bottom portion of the outer shell 2 in the aforementioned manner is less than a predetermined amount, the float 38 is seated on the drain valve seat 36 to hinder the discharge of the condensate. When condensate is gathered in more than the predetermined amount, the float 38 is lifted to be separated from the drain valve seat 36, thus allowing the condensate to be discharged through the drain valve seat 36 to the outside of the outer shell 2.

Figure 1:
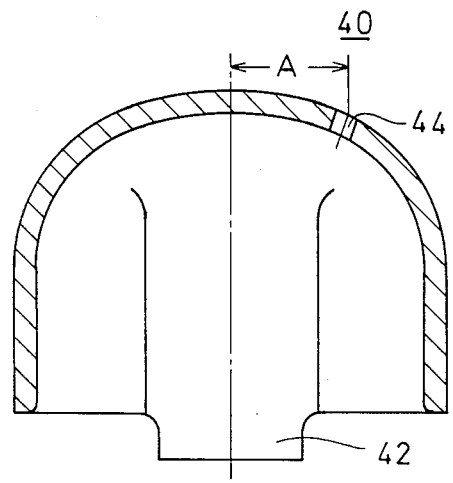
FIG. 1 is a vertical sectional view of a float cover employed in the pressure reducing valve of a preferred embodiment according to the present invention.
Figure 2:
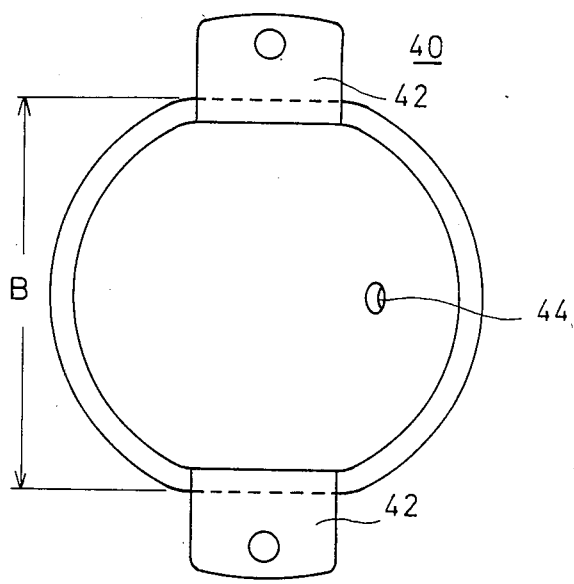
FIG. 2 is a bottom plan view of the float cover in FIG. 1.

A float cover 40 is provided so as to cover substantially the upper half of the float 38. As shown in FIGS. 1 and 2, the float cover 40 is formed with a dome-like structure having a substantially elliptical shape as seen in plan view. Reference numerals 42 designate legs for fixing the float cover 40. The float cover 40 is formed with a small through-hole or aperture 44 at a position somewhat lower than the top of the float cover 40, that is, at a position laterally spaced a distance A from the center of a major axis of the float cover 40 as viewed in plan. The distance A is obtained by multiplying an outer diameter B along the minor axis by a predetermined coefficient α(0.2–0.36).

The coefficient α is obtained experimentally or empirically. If the small hole 44 is formed at the top of the float cover 40, separation efficiency deteriorates because of a whirling-up of the condensate. In contrast, if the small hole 44 is formed at the lower end portion of the float cover 40, the float 38 is hindered from lifting. Accordingly, the small hole 44 in the present invention is formed at an intermediate position between the top and the lower end, where no whirling up of the condensate is generated. According to the invention, as mentioned above, a distance between a lower end of the cylindrical member 6 and the top of the float cover 40 is experimentally determined so as not to generate turbulence or a whirling-up phenomenon of the condensate by swirling steam. In this case, maximum separation efficiency is 95%. Therefore, the distance between the lower end of the cylindrical member 6 and the top of the float cover 40 is set to a proper value in view of compactness of the overall device and the distance A and the outer diameter B are measured so that separation efficiency may reach 95%. That is, there is generated no turbulence or whirling-up phenomenon of the condensate through the small hole 44, thereby obtaining the coefficient α. The following table shows the distance A and the outer diameter B providing the best results of the coefficient α for various Size C of the inlet hole 20.

TABLE I

| Size C (mm) | Distance A (mm) | Outer Diameter B (mm) | α = A/B |
|---|---|---|---|
| 15 | 16 ± 3.2 | 59 | 0.217–0.325 |
| 20 | 16 ± 3.2 | 59 | " |
| 25 | 20 ± 4 | 70 | 0.229–0.343 |
| 32 | 20 ± 4 | 70 | " |
| 40 | 20 ± 4 | 70 | " |
| 50 | 30 ± 5 | 97 | 0.258–0.361 |

Table II below sets forth data regarding the diameter of orifices 44

TABLE II

| Size (mm) | Orifice dia. (single orifice) D (mm) | Orifice dia. (double orifices) E (mm) |
|---|---|---|
| 15 | 4,5 | 3,2 |
| 20 | " | " |
| 25 | 5,6 | 4,0 |
| 32 | " | " |
| 40 | " | " |
| 50 | 7,1 | 5,0 | where a single orifice is used, the diameter D applies as shown above. However, double orifices can also be used. In the case of double orifices 44, the diameter E applies.

The diameters listed are those considered most appropriate as found by experimentation. It should be noted that the holes having diameters around the specified values are, of course, satisfactorily effective. If the number of orifices used is more than two, the diameter should be determined so that the total sectional area of the orifices is equal to that of a single orifice.

It should be appreciated that each value of the distances A involves some tolerances and this results from the fact that a tolerance generated upon forming the small hole 44 has been taken into consideration. As will be apparent from Table I, when α is selected in the range of about 0.2 to 0.36, whirling-up of the condensate is not generated and separation efficiency is improved.

Although, in the aforementioned embodiment, the condensate separating and discharging device is described as involving the pressure reducing valve, condensate separation efficiency is almost not changed, even when the pressure reducing valve section is not involved in the condensate separating and discharging device.

Further, although the small hole is singly provided in the aforementioned embodiment, two small holes may be formed at positions symmetrical with respect to the center of the float cover at the distance A from the center, so that residual air in the float cover may be quickly discharged.

Moreover, it is sufficient that the small hole be located at a position spaced apart from the center by the distance A, that is, on a circle having the radius A. Therefore, it is not necessary to position the two small holes in symmetrical relationship with each other and, furthermore, two or more small holes or apertures may be formed.

As described above, since the small hole is formed through a float cover at a position on a circle having a center identical with that of the float cover and having a radius obtained by multiplying an outer diameter of the float cover by the coefficient ranging from 0.2 to 0.36, there is not generated whirling-up phenomenon of the condensate, thereby improving the separation efficiency. Further, since the condensate separating and discharging device of the present invention includes the integrally formed separator and trap, and may also involve the pressure reducing valve, it is more effective for simplification of piping work.

While a specific embodiment of the invention has been shown and described in detail to illustrate the application of the inventive principles, it will be understood that the invention may be embodied otherwise without departing such principles.

What is claimed is:

1. In a condensate separating and discharging device including inlet means, a separator section for directing into a swirling flow pattern gas containing condensate entering through said inlet means, exhaust means for exhausting gas passing through said separator section, a steam trap section provided below said separator section for receiving condensate therefrom, and condensate discharge valve means in said trap section including a float and a domed cover covering said float, the improvement comprising aperture means in said domed cover formed at a position on a circle having a center identical with a center of said domed cover and having a radius obtained by multiplying an outer diameter of said domed cover by a coefficient having a value between 0.2 and 0.36.

2. The improvement according to claim 1, wherein said coefficient is empirically obtained.

3. The improvement according to claim 1, wherein said device also includes pressure reducing valve means.

4. The improvement according to claim 1, wherein said aperture means consist of only a single hole extending through said domed cover.

5. The improvement according to claim 1, wherein said aperture means consist of a plurality of holes extending through said domed cover.

6. The improvement according to claim 1, wherein said aperture means consist of at least one hole in said domed cover which is relatively small in size.

* * * * *